United States Patent [19]

Johansson et al.

[11] Patent Number: 4,999,153
[45] Date of Patent: Mar. 12, 1991

[54] FLOW TRIPPER IN COMBINATION WITH SPACER DEFLECTOR

[75] Inventors: Eric B. Johansson; Robert B. Elkins, both of San Jose; Russell L. Crowther, Saratoga; Bruce Matzner, San Jose, all of Calif.

[73] Assignee: General Electric Company, San Jose, Calif.

[21] Appl. No.: 497,803

[22] Filed: Mar. 21, 1990

[51] Int. Cl.$^5$ ............................................. G21C 3/34
[52] U.S. Cl. .................................... 376/443; 376/439; 376/444; 376/448
[58] Field of Search ............... 376/439, 443, 444, 448, 376/434, 438, 457

[56] References Cited

U.S. PATENT DOCUMENTS 4,728,490  3/1988  Taleyarkhan .................. 376/439
4,749,543  6/1988  Crowther ........................ 376/443

FOREIGN PATENT DOCUMENTS 62-246611  9/1987  Japan

Primary Examiner—Donald P. Walsh
Attorney, Agent, or Firm—Robert R. Schroeder; Harry C. Burgess

[57] ABSTRACT

A combination of flow trippers with spacer deflectors in the two phase steam/water region of a fuel bundle in a boiling water reactor is disclosed. Spacers with deflectors are placed immediately above the flow trippers. The flow trippers are located on either an inside channel wall surrounding the fuel bundle or the outside of water chambers within the fuel bundle. Additional flow trippers may be located adjacent to the spacers, above the flow trippers that are below the spacers. The spacers are provided with deflector skirts overlying the flow trippers. In operation of the fuel bundle, excess water flows in the two phase region in a film on the unheated inside walls of the fuel channel or the outside walls of the water chambers. The film flow is perturbed by the flow trippers and is deflected toward the fuel rods. The overlying deflector skirts or tabs on the spacers further deflect the liquid toward the fuel rods to improve cooling and to increase the power generation capability of the fuel bundle. A preferred embodiment includes deflector tabs at the top of the spacer for further deflecting the stripped water layer towards the fuel rods. The synergistic combination of flow trippers and spacer deflector skirts and tabs provide better cooling than would be predicted by adding the separate effects of flow trippers, deflector skirts and flow tabs.

14 Claims, 7 Drawing Sheets

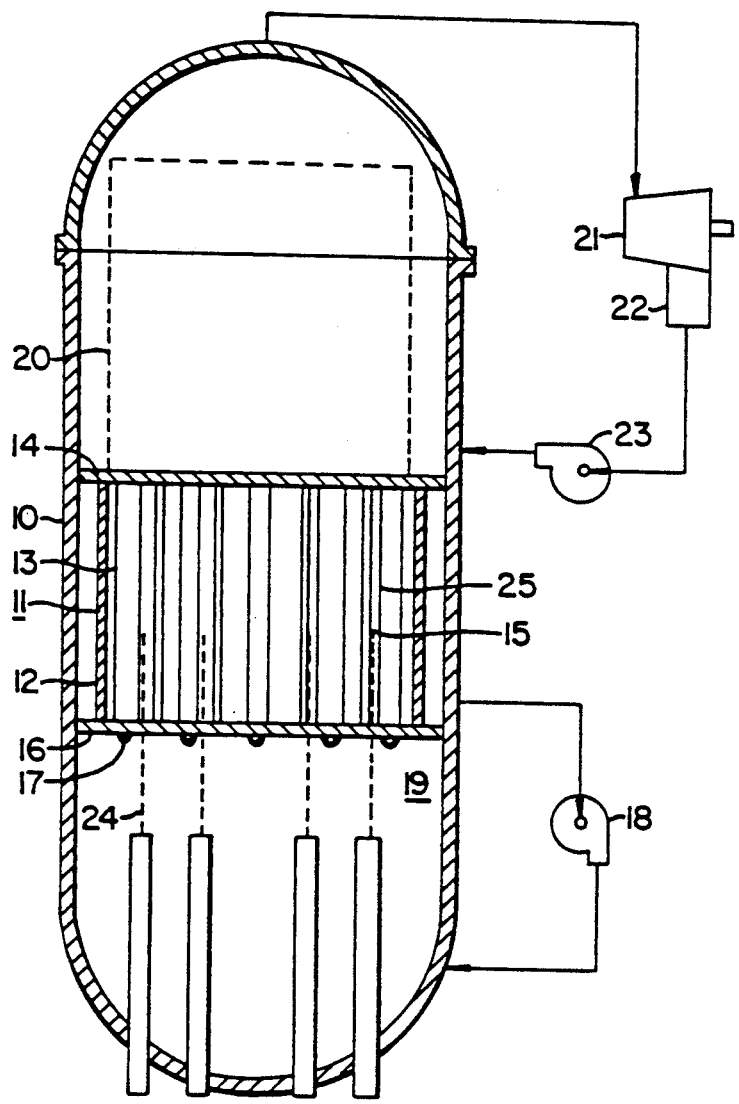
FIG._1.
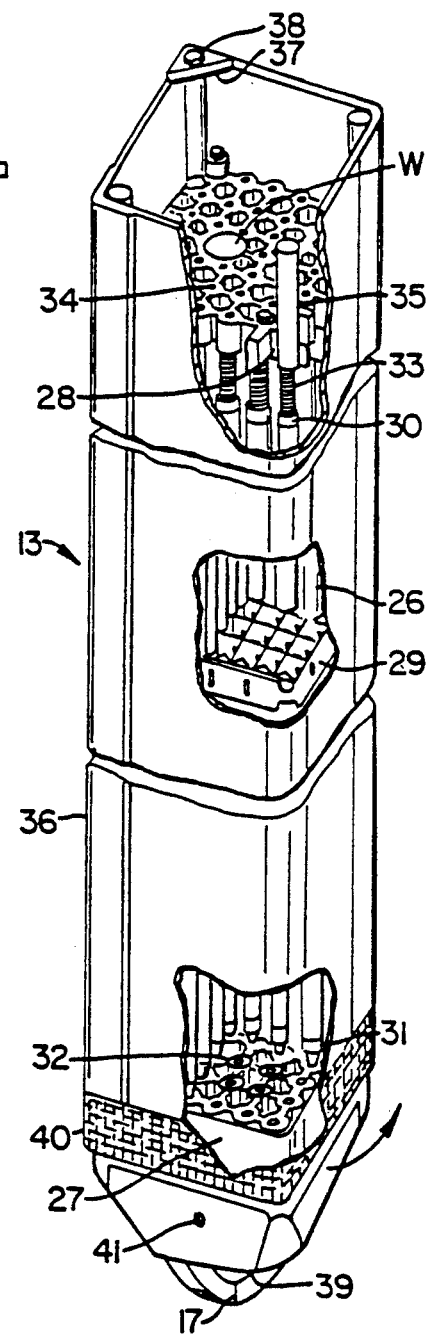
FIG._2.

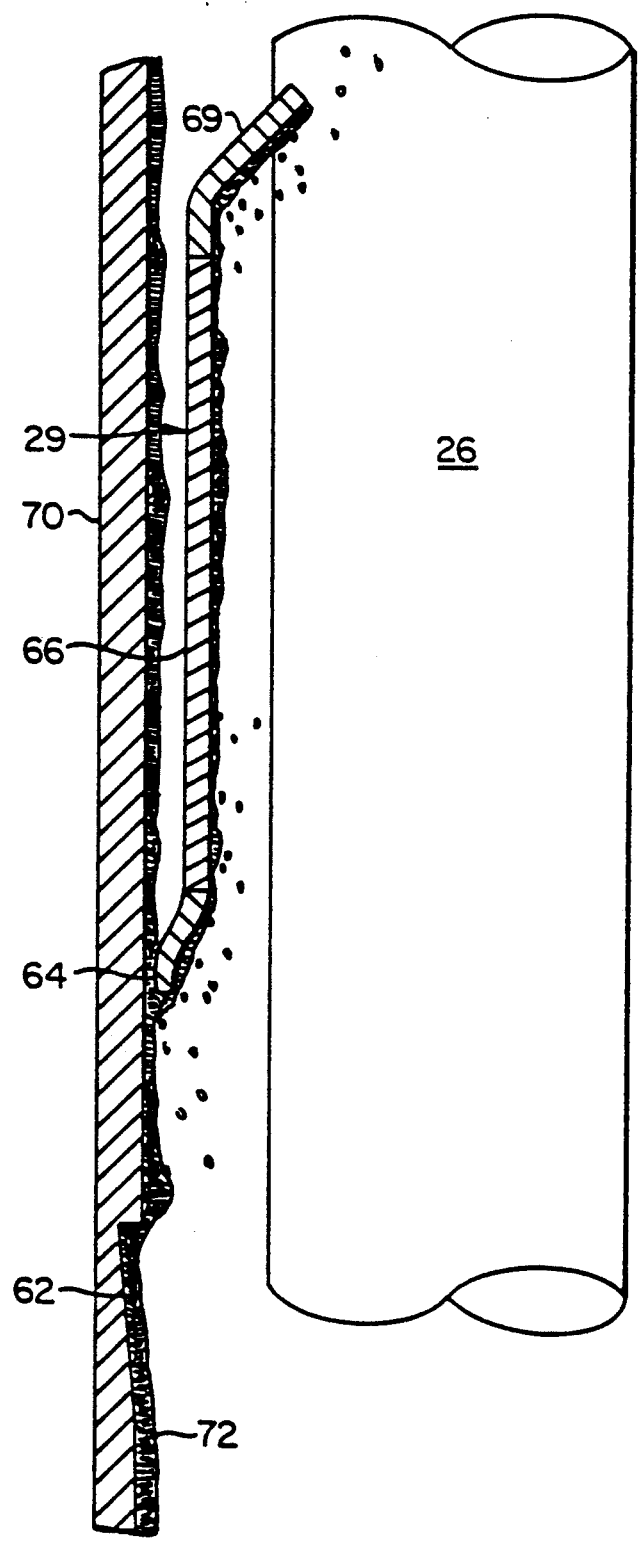
FIG._3.

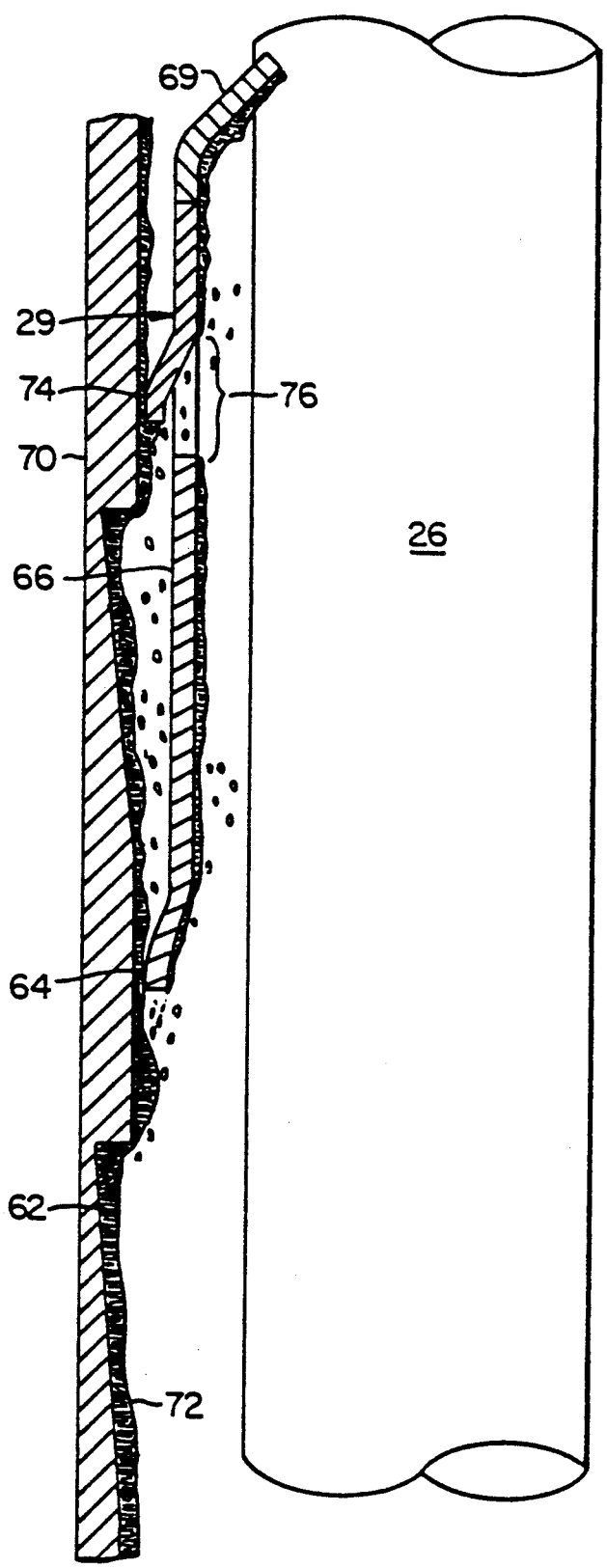
FIG._4.

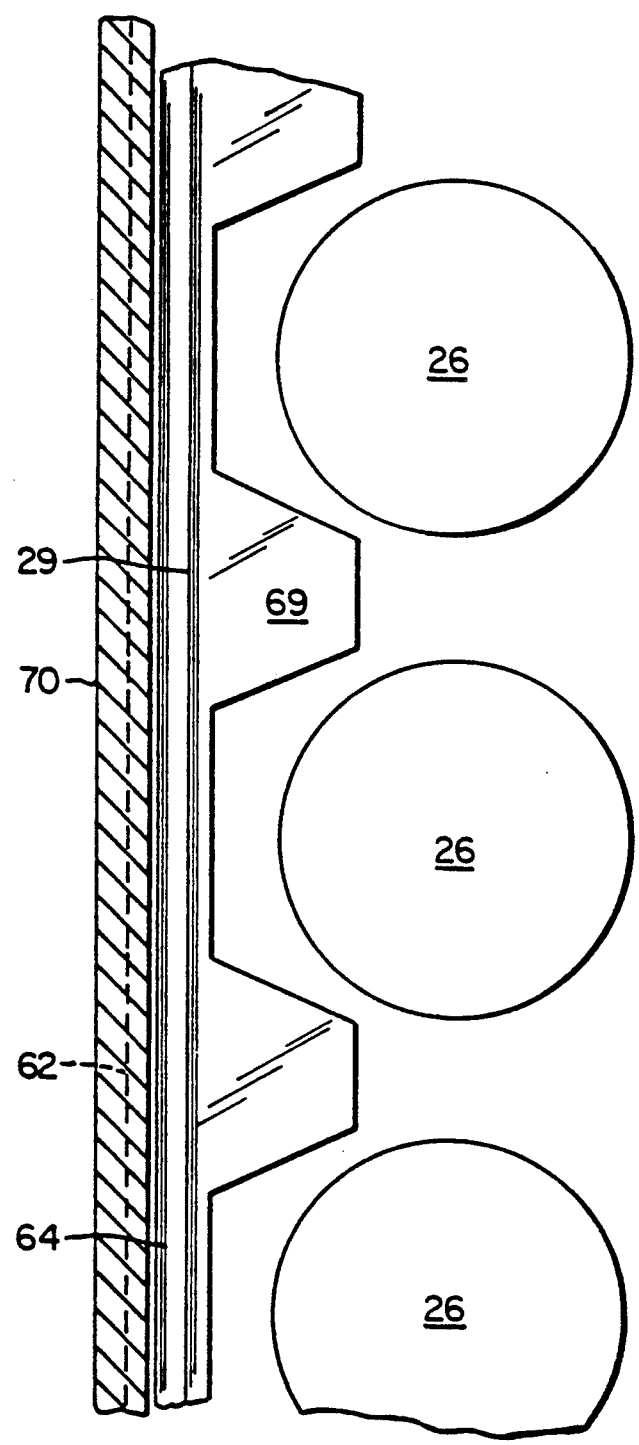
FIG._5.

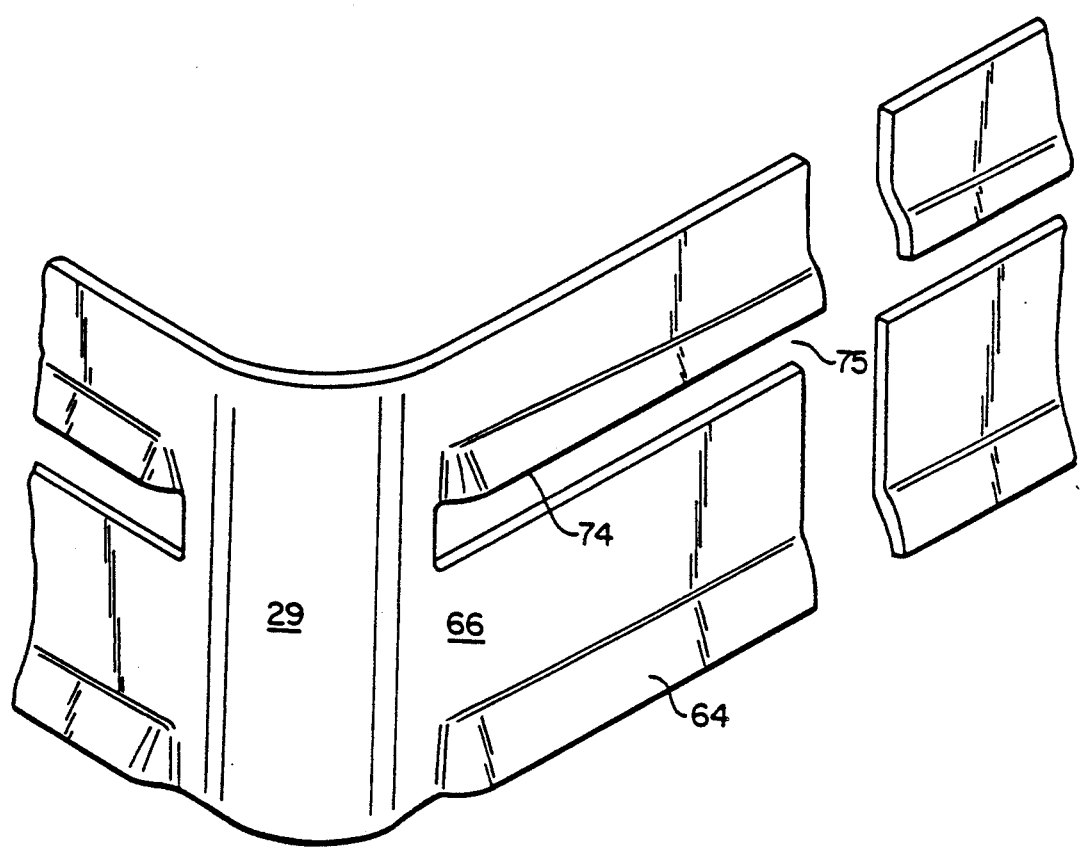
FIG._6.

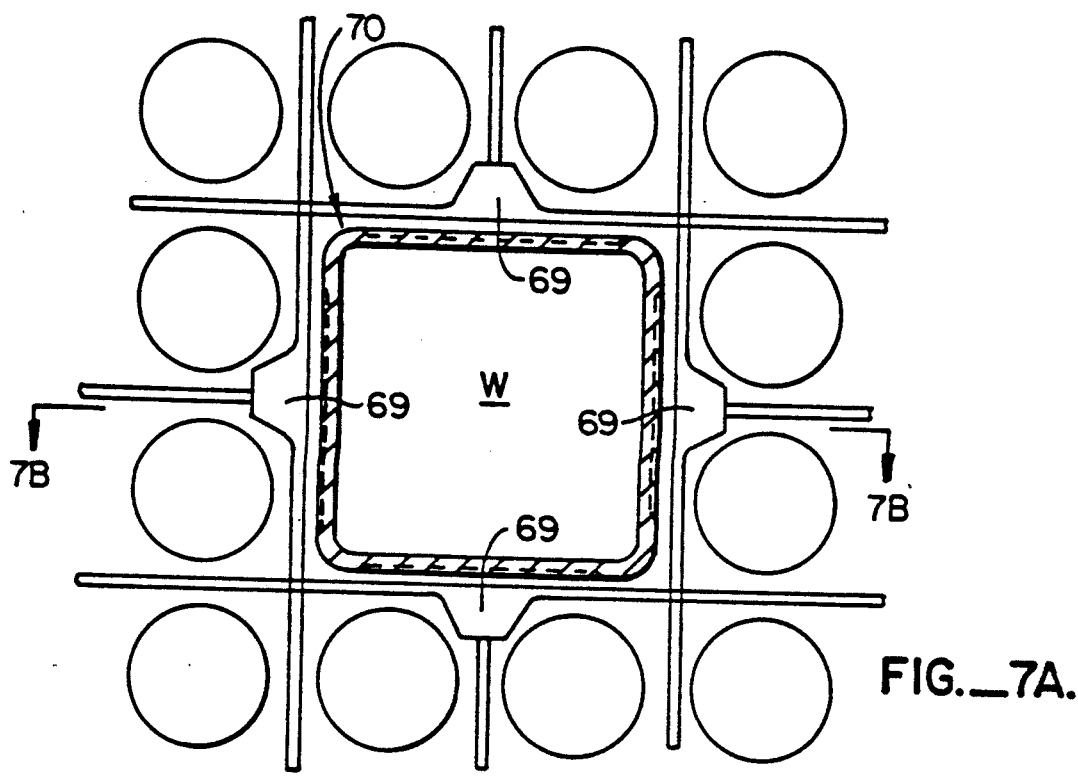
FIG._7A.
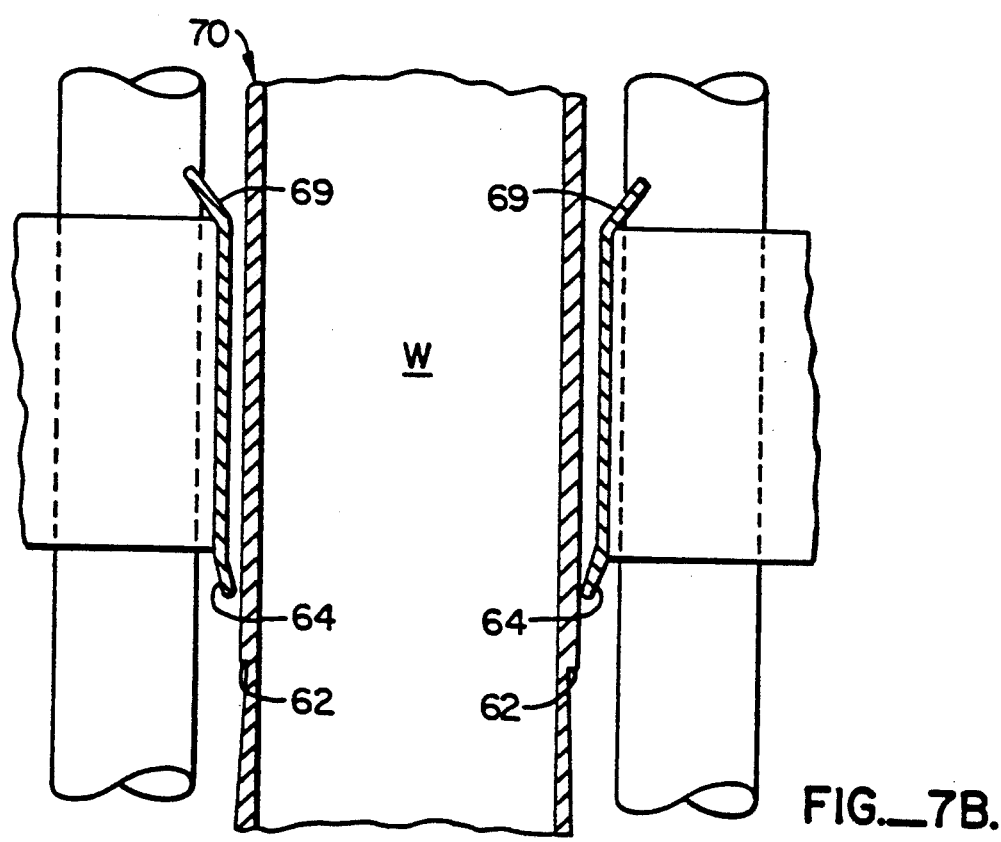
FIG._7B.

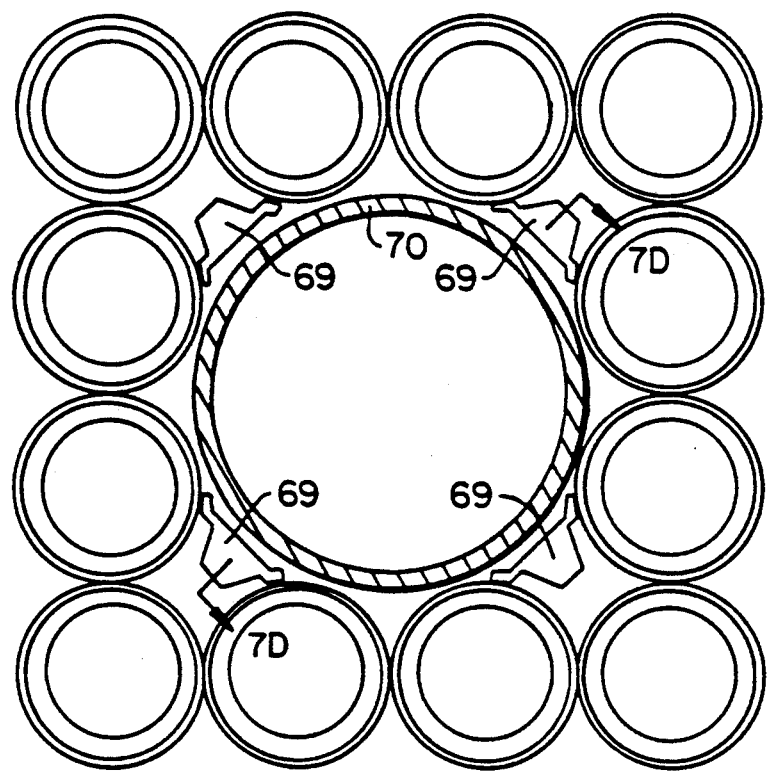
FIG._7C.
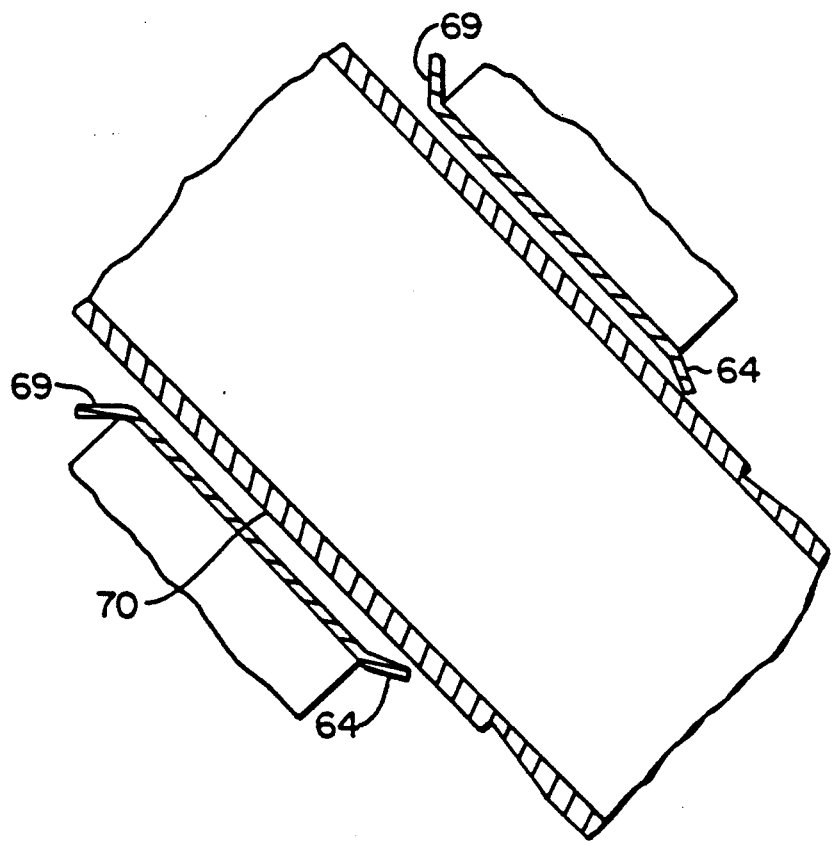
FIG._7D.

FLOW TRIPPER IN COMBINATION WITH SPACER DEFLECTOR

This invention relates to fuel bundles and boiling water reactors. More specifically, a flow tripper is combined with deflectors on spacer structures so that improved heat transfer occurs in the two phase region of the fuel bundle.

SUMMARY OF THE PRIOR ART

Fuel bundles in boiling water nuclear reactors are of standard construction.

Typically, the fuel bundles include a lower tie-plate through which water is introduced to the interior of the fuel bundle.

The fuel bundle further includes an upper tie-plate through which both water and generated steam escape.

A fuel channel surrounds the lower tie-plate and extends to and likewise surrounds the upper tie-plate. This channel allows flow between the two tie plates and isolates that flow from fluids outside of the fuel bundle.

Between the two tie-plates and within the fuel channel there are placed fuel rods. These fuel rods generate the steam by heating water interior of the fuel bundle.

The two tie-plates serve to support the steam generating fuel rods in parallel upstanding side-by-side relation.

To restrict fuel rod motion and to assure their parallel side-by-side relation, so-called "spacers" are utilized. There are typically seven spacers for a 165 inch long fuel bundle evenly distributed along the length of the fuel bundle. The spacers surround the fuel rods and maintain the fuel rods in side-by-side relation and keep the rods from either contacting one another or otherwise undergoing appreciable vibratory movement.

Water, in a boiling water reactor, serves two purposes. First, the water is turned into steam, which steam is the source from which power is extracted. Second, the presence of the water moderates fast neutrons from nuclear reactions. These fast neutrons are moderated to slow neutrons. Some of the fast neutrons and many of the slow neutrons cause nuclear fission events which produce additional fast neutrons. The reaction is steady state for a critical system, with production of new neutrons equaling losses from neutron capture and leakage.

It is desirable in fuel bundles, that water be distributed optimally. Because of the distribution of steam voids which occurs from the boiling process the water or moderator density is greater in the bottom of the reactor and smallest at the top of the reactor. During operation the single phase water enters the fuel bundle through lower a tie-plate and proceeds upwardly through the inside of the channel to and towards the upper tie-plate. As the water proceeds upwardly, the water is heated by the fuel rods and in its upward path commences to boil. That length of the fuel channel wherein the water is boiling is referred to as the two phase region. This region has a water phase and a steam phase intermixed.

At the top of a fuel bundle where steam concentration is largest, less moderation of neutrons occurs. In the usual reactor design which has a negative steam void coefficient of reactivity, the power production in the fuel bundle is less in such regions of greater steam voids.

Nonboiling water in the reactor, such as that in the water gaps between assemblies and within water filled rods or chambers in the fuel assembly, reduces the change in moderation between the top and the bottom of the reactor. The water chambers can be circular, square, cruciform or some other cross sectional shape and there may be multiple water chambers within the fuel assembly. The nonboiling water in the gaps between fuel assemblies and in water chambers within fuel assemblies, is varied in design to optimize performance and economics.

As a result of flow forces on the components of the steam-water mixture, liquid tends to flow up the surface of the fuel rods, and the higher velocity steam flows in open regions between fuel rods. When power is increased on a fuel rod, the thickness of the water layer on the fuel rods decreases. If the water thickness becomes too small, overheating and thermal instabilities can occur.

Water also flows in a layer on the inside of the channel surrounding the fuel bundles. However, unlike the fuel rods, the channels do not contain fissionable material. The outside of the channel is exposed to the slightly cooler bypass region of the reactor. Consequently, the water layer on the inside of the channel does not boil. If some of this water can be transferred to the fuel rods, fuel rod overheating and thermal instabilities will be suppressed, and more power can be obtained from the fuel bundle.

The same situation occurs on water rods in the fuel bundle. Typically, a large water rod displaces four to nine fuel rods. The cross section can be round, square or can have a more complex shape. The water flowing in the interior of the water rods keeps the surface of the water rod below boiling.

The outside of the water rods is analogous to the inside of the channel wall, which because it is not heated directly by the nuclear fuel, has relatively thick water films that flow up the exterior of the water rods.

It has been suggested in the prior art to incorporate flow trippers on the inside of the channels to divert water flowing on the channel walls to the fuel rods. Unfortunately, such trippers have heretofore interfered with the insertion of fuel bundles and have increased channel pressure drop. They consisted of protrusions out from and additions to the inner channel walls.

DISCLOSURE NOT PRIOR ART

In a patent application entitled Axially Shaped Channel With Integral Flow Tripper, patent application Ser. No. 029,508, filed Mar. 24, 1987, now U.S. Pat. No. 4,749,543, issued June 7, 1988, some of these problems have been addressed. Said disclosure sets forth the combination of fuel channels having tapered walls and incorporated flow trippers. The flow tripper there serve two purposes.

First, the material of the channel at the top of the fuel channel is reduced. This reduces undesired neutron absorption and removes material from the top of the fuel channel where, due to reduced pressure differential across the channel, thinner material can be utilized.

Secondly, the flow trippers there disclosed are shallow grooves in the wall of the channel. These shallow grooves strip the water flowing up the upper portion of the inside channel wall and divert it to the fuel rods. There is no protrusion into the fuel bundle interior. Consequently, there is no interference with required access interior of the fuel channel.

SUMMARY OF THE INVENTION

In combination with a flow tripper in the two phase steam/water region of a fuel bundle in a boiling water reactor, spacers with one or more deflectors are placed above one or more flow trippers. The flow trippers are configured on either an inside channel wall of the fuel bundle or the outside surface of water rods within the fuel bundle. The spacers are provided with deflector skirts above the flow trippers. In operation of the fuel bundle, water flows in the two phase region in a layer on the inside wall of the fuel channel or the outside wall of the large water rod. This flow of water is diverted away from the channel or water rod surfaces by the flow trippers. This diverted water moves away from the surface of the channel or water rods where it impinges on the deflector skirts on the spacers. The deflector skirts act in concert with the flow trippers to increase deflection of the water towards the fuel rods for steam generation. A preferred embodiment includes deflector tabs at the top of the spacer for further deflecting the stripped water layer towards the fuel rods. The synergistic combination of flow trippers and spacer flow deflector skirts and tabs results in a large improvement in heat transfer. This improvement is greater than the sum of improvements of the individual features by themselves.

OTHER OBJECTS, FEATURES AND ADVANTAGES

An object of this invention is to disclose a cooperative, synergistic relationship between flow trippers and an immediate overlying spacer incorporating flow deflection skirts and tabs. Accordingly, a flow tripper is configured on the inside of the fuel channel in the two phase flow region of the channel. The flow trippers are placed so as to underlie fuel rod spacers. The spacers preferably have peripheral bands. The peripheral bands are belled at the bottom so that the bands define outwardly flaring skirts. These outwardly flaring skirts extend to and are almost in contact with the channel walls immediately overlying the flow trippers. During steam generation in the two phase region of the fuel channel, water is redirected at the flow tripper from the channel wall and thereafter deflected by the band skirt towards the fuel rods. More efficient heat transfer and steam generation then occurs. The increase in pressure drop caused by the flow skirts and flow tabs on the spacers is reduced by the larger channel flow area that results from cutting the trippers into the channel wall.

A further object of this invention is to apply this same principle to water rods located in the interior of the fuel assembly away from the channel walls. Accordingly, flow trippers are located on the outside surface of the water rods immediately underlying the spacers. The spacers are provided with deflectors adjacent to the exterior of the water rod or rods. The deflectors adjacent the water rods, like the skirts adjacent the channel walls, extend towards the water rods, to a disposition where the deflectors almost contact the water rods. During steam generation in the two phase region of the fuel channel, water is diverted by the flow trippers from the outside of the water rod and thereafter deflected by the spacer flow deflectors into the matrix of spaced apart fuel rods.

In both embodiments, the addition of deflector tabs at the upper portion of the spacer is disclosed. These deflector tabs further deflect the water into the matrix of fuel rods for improved heat transfer.

An advantage of this invention is that for the first time there is a disclosure of a synergistic design of the spacers combined with flow trippers.

The combination gives improvements in heat transfer and steam generation which are greater than the sum of the individual improvements due to flow trippers, spacer skirts, and spacer flow tabs.

Other objects, features and advantages of this invention will be more apparent after referring to the following specification and attached drawings in which:

FIG. 1 is schematic of a reactor in which the invention is installed.

FIG. 2 is a perspective view of a fuel bundle illustrating the upper tie-plate, lower tie-plate and channel therebetween surrounding a matrix of fuel rods with a large central water rod and illustrating a flow tripper and spacer in accordance with this disclosure;

FIG. 3 is a generic cross section illustrating the construction, configuration and operating principles of this invention; this cross section being applicable to either a channel inside sidewall or an water rod outside sidewall;

FIG. 4 is an alternate arrangement of the generic view of FIG. 2;

FIG. 5 is a plan view illustrating the invention applied to the inside of the channel;

FIG. 6 is a perspective view of the construction of the spacer band for placement adjacent the inside channel side wall in accordance with the alternate arrangement illustrated in FIG. 3; and FIGS. 7A through 7D show two examples of spacer skirts and flow tabs adjacent to large water rods with FIGS. 7A and 7B showing respective plan and side elevations of water rod of square cross section together with a square grid spacer while FIGS. 7C and 7D show respective plan and side elevations or a circular water rod together with a circular ferrule spacer.

GENERAL DESCRIPTION

The invention herein relates to a water cooled and moderated nuclear reactor. In explaining the schematic of FIG. 1, attention will first be directed to the steam cycle. Second, comment will be made about the need for water in boiling water nuclear reactors to moderate fast neutrons to slow neutrons for an efficient nuclear reaction. Finally, a description of a standard fuel bundle will be made, with emphasis on both the need for the moderation of the fast neutrons and the generation of steam interior of the fuel bundle.

Referring to FIG. 1, reactor vessel 10 is illustrated having core 11 confined between top guide 14 and core plate 16. A plurality of fuel bundles 13 are supported at core plate 16 at the bottom and extend to top guide 14 at the top so as to stand in parallel vertical side-by-side relation.

Two flow paths are present in the core, both from the bottom of the core to the top of the core. The first flow path is through the fuel bundles 13. The second flow path is outside of the fuel bundles 13 and in the core bypass area 25.

Circulation related to the steam cycle of the plant is illustrated by FIG. 1. Feedwater pumps 23 inject feedwater interior of the reactor vessel 10. Water interior of the reactor is converted to steam upon upward passage through core 11. At steam separation and dryer volume 20, steam passes out the upper end of the reactor vessel 10, passes through turbine 21, is condensed into condensate at condenser 22 and then passes through feedwater pumps 23 where it passes back into the reactor vessel 10. The reader will understand that this cycle has been simplified for purposes of this portion of the disclosure.

To provide more efficient core cooling, water is circulated inside the reactor vessel 10. Simply stated a main circulation pump 18 takes a suction on an outflow from the reactor vessel, adds recirculation head, and injects the water interior of the reactor vessel to jet pumps (not shown). The jet pumps interior of the reactor cause an overall circulation of the water within the forced circulation reactor. Natural circulation, with no recirculation pumps also is a feasible alternative.

In the jet pump forced circulation interior of the reactor vessel the combination of feedwater flow and water separated by the steam separator passes downwardly outside of the core 11, between the core shroud and the inside walls of the reactor vessel 10. The water passes below the core plate 16 from which it flows upwardly through the reactor in two or more paths. First, there is a path through the fuel bundles 13. Second, there are paths through the core bypass volume 25, consisting of flow outside the channels and flow inside the water rods.

The water that flows through the reactor core serves the dual function of cooling the fuel and moderating or slowing down neutrons. Although fast neutrons cause fission, the probability of fission events occurring is greatly increased if the neutrons are traveling at slower speed. Consequently the water in the reactor core improves the efficiency of the fission process and reduces the amount of fissile material that is needed to sustain a steady state nuclear reaction, whereby the neutrons being created by fission equal the neutrons being lost by absorption and leakage.

In a boiling water reactor, the smaller moderator density in the top of the reactor, caused by steam, reduces the efficiency of the fission process in the top of the reactor relative to the bottom and causes the power to be peaked toward the inlet of the reactor core. If not compensated by suitable means the axial power peaking can be excessive and limit the power output of the reactor.

A conventional prior art solution to the axial moderator distribution and associated power peaking problems is to provide nonboiling bypass flow through the reactor core. Such bypass flow reduces the change in moderator density from the bottom to the top of the reactor by superimposing a fixed moderator distribution in the bypass region to the variable axially variable moderation distribution inside the boiling channel.

Two prior art methods of providing nonboiling bypass flow through the reactor are by providing open spaces outside the channels and by providing water rods inside the fuel bundle. The channels are required to separate the bypass flow around their exterior from the inchannel boiling flow. Water rods are of varying size ranging from the size of fuel rods to large water rods of different geometric shapes that replace several fuel rods in the fuel assembly.

Having set forth the interior of the reactor and the general problem areas encountered, a description of a fuel bundle 13 is in order.

Referring to FIG. 2, a fuel bundle 13 is illustrated. This bundle includes lower tie-plate 17 and upper tie-plate 34. The function of the tie-plates is to hold an array of fuel rods 26 in upstanding side-by-side vertical relation. As a secondary function, some—but not all—of the fuel rods 26 are attached to the upper and lower tie-plate to secure the tie-plates together.

A fuel channel 40 extends between the lower tie-plate 17 and the upper tie-plate 34. Channel 40 surrounds the lower tie-plate 17, surrounds the upper tie-plate 34, and surrounds the fuel rods 26 therebetween. Thus, the channel member 40 constitutes a boundary. Inside of the channel 40 steam is formed on the fuel rods 26. Outside of the channel 40 moderating water is present in the core bypass volume. Thus, the inside walls of the channel are cool. Layers of water flow up the walls in the two phase or steam generating portion of the fuel bundle.

Centrally of the fuel bundle 13 there is placed a large water moderator rod W. Water moderator rod W has water in its interior for the required neutron moderation. Sufficient flow is provided through this water rod so that steam is not present to any appreciable degree. Thus, the walls of the large water moderator rod W are cool. Layers of water flow up the outside walls in the two phase or steam generating portion of the fuel bundle.

Intermediate of the upper and lower tie-plate, and within the channel 40 there are located spacers 29. The function of spacers 29 is to maintain fuel rods 26 in side-by-side relation. To accomplish this objective, approximately seven spacers are utilized.

Approximately four or five of the spacers are in the upper two phase region of the fuel bundle. It is these spacers to which the improvement of this invention is applicable.

The preferred embodiment is illustrated in detail as FIG. 3 of this disclosure.

FIG. 3 is a generic description of this invention. In the figure, wall 70 can either be the interior wall of the fuel channel 40 (see FIGS. 5 and 6) or the exterior wall of a water rod W (see FIG. 7). Wall 70 has configured therein a flow tripper at 62. In the preferred embodiment, flow tripper 62 consists of a tapered groove in the wall 70.

Element 66 can constitute one of two separation configurations.

First, it can comprise a peripheral band around the spacer.

Second, it can comprise a member placed adjacent the water rod at the center of the fuel bundle.

It will be noticed that element 66 is provided with a deflector 64. Deflector 64 can either be a skirt around the lower exterior of the peripheral band of a spacer or alternatively a deflector tab at the bottom of a central structure adjacent the large water rod. It will be seen that deflector 64 almost comes into contact with wall 70.

At the top portion thereof, there is a deflector tab 69. The deflector tab 69 extends into and towards a fuel rod 26.

Function of the flow tripper 62 is easily illustrated. Specifically, water layer 72 flows upwardly until it encounters the upper edge of the flow tripper 62. At upper edge of the flow tripper 62, water is deflected outwardly from the wall 70 into the two phase mixture region. This causes the wave height of the flowing liquid film to increase and causes more liquid to be transported to the surface of the fuel rods.

The liquid film is perturbed sufficiently by the tripper that it hits the inside of the skirt or deflector 64 and is moved inwardly to and towards the fuel rod 26. This causes the liquid film thickness on the fuel rods to increase which increases the power production capability of the fuel assembly through improved cooling of the fuel rod.

Further, and at the upward portion at deflector 69, a further inward deflection of liquid particles to the fuel rods 26 occurs.

It is, therefore, seen that the spacer in cooperation with the water rod and channel is producing the desired improved fuel rod cooling by causing the liquid film flowing up the channel and water rods to be deflected to the fuel rods.

Referring briefly to FIG. 4, an alternate embodiment of this invention is illustrated for use on the spacer adjacent the inside channel wall, or adjacent the water rod. Specifically, a second outwardly deflected skirt 74 is configured within member 66. This second skirt deflects the water film as it is perturbed above the flow tripper 62 or above a second flow tripper 67. The trippers cause turbulence in the water film and the wave height in the water film is increased above the tripper. The skirt 74 in its protrusion deflects this perturbed liquid film to and towards the fuel rods 26.

A perspective view of this deflector may be seen in the view of FIG. 6, the deflector here being shown in the band around the peripheral edge of the spacer. In order to facilitate the entry of the liquid film, an aperture 75 enables the liquid film to flow through the wall 66.

Referring to FIG. 5, a top plan view of the spacer adjacent the wall is illustrated. In this view, it is seen how the cross sectional configuration of FIGS. 3 and 4 operates on the inside wall of the fuel channel and shows that upper deflector 69 is located between fuel rods.

FIGS. 7A and 7B show the combination of flow trippers 62, spacer skirts 64 and flow tabs 69 applied to both square sectioned and circular sectioned water rods. FIGS. 7A and 7B shows a water rod 70 with square cross section. FIGS. 7C and 7D show a water rod 70 with a circular cross section. In each case, water is stripped at the flow tripper, deflected away from the water rod by the spacer skirt 64, and finally deflected inwardly to fuel rods at flow tabs 69.

The reader will understand that although the flow trippers herein illustrated have constituted tapered grooves in the wall of both the large water rod and the interior of the channel, outwardly extending protrusions or flow spoilers could as well act as liquid film flow trippers.

What is claimed is:

1. In a fuel bundle for a boiling water nuclear reactor having an upper tie-plate, a lower tie-plate, a channel extending between and surrounding said tie-plates and having an inside channel wall, a plurality of fuel rods supported at the top by said upper tie-plate and supported at the bottom by said lower tie-plate and held in upstanding side-by-side parallel vertical relation between said tie-plate within said fuel bundle by fuel rod spacers, said fuel bundles for heating water coolant introduced through said lower tie-plate into the interior of said channel and producing a two phase water steam mixture in the upper portion of said channel, and at least one spacer located in said upper portion of said fuel bundle in said two-phase water steam mixture;

the improvement in said channel and said spacer comprising:

flow trippers configured in said inside channel wall in said upper two phase region of said reactor, said flow tripper being placed immediately below the spacers and providing a groove configured into the wall of said channel having a discontinuity at the upper edge thereof for diverting water flowing along the inside channel wall away from said wall;

said spacers having a peripheral band, said band circumscribing said spacers and having a lower portion immediately overlying said trippers;

said peripheral band having an outwardly bent skirt at the lower portion of said band extending to and towards said inside channel wall immediately overlying said flow trippers whereby water flowing along said inside channel wall is diverted away from said channel wall and deflected by said flow tripper to said outwardly flared skirts for further deflection towards said fuel rods within said fuel bundle.

2. The fuel bundle of claim 1 and including at the upper portion of said band inwardly deflecting tabs, said tabs for deflecting water to and towards said fuel rods.

3. The invention of claim 2 whereby the flow deflection tabs are centered between fuel rods and have a tapered shape which generally follows the contour of the exterior of the fuel rods.

4. The invention of claim 1 and including in said band first and second outwardly flared skirts;

said second outwardly flared skirt being defined in said band between the top of said band and the bottom of said band, said outwardly flared skirt located above an aperture between the inside wall of said fuel channel and the interior volume of said spacer whereby water passing between said band and said inside wall of said channel is deflected to and towards said fuel bundles.

5. The invention of claim 4 whereby a second flow tripper is located in the channel wall adjacent to the spacer and below the second outwardly flared flow deflecting skirt.

6. In a fuel bundle for a boiling water nuclear reactor having an upper tie-plate, a lower tie-plate, a channel extending between and surrounding said tie-plates, a plurality of fuel rods supported at the top by said upper tie-plate and supported at the bottom by said lower tie-plate and held in parallel side-by-side upstanding vertical relation within said fuel bundle by fuel rod spacers, said fuel bundle for heating water coolant introduced through said lower tie-plate to the interior of said channel and producing a two phase water steam mixture in the upper portion of said channel, one or more water rods or water filled chambers connected at the bottom to said lower tie-plate and at the top to said upper tie-plate and supported in vertical parallel relation parallel to said fuel rods, by spacers, said water rods or chambers defining an exterior wall exposed to the interior of said fuel bundle and being of circular, square, cruciform or some other cross sectional shape, the improvement in said water chambers and spacers comprising:

flow trippers configured in the outside wall of said water chambers in said upper two phase region of said fuel bundle, said flow trippers being placed below the spacers and providing an groove configured into the exterior wall of said water chamber having a discontinuity at the upper edge thereof for diverting water flowing along the exterior wall of said water chamber;

spacer deflector tab members, said members having a first part overlying said flow trippers;

said deflectors extending towards the outside of said water chambers overlying said flow trippers whereby liquid deflected from the outside of said water chambers by said flow trippers is further deflected to and towards said fuel rods within said fuel bundle.

7. The invention of claim 6 and wherein said deflector member has at the upper end thereof a tab, said tab for deflecting liquid and flow to and towards said fuel rods.

8. The invention of claim 7 wherein said deflector tabs are centered at lines centered in the interstices between fuel rods and have a tapered shape which generally follows the contour of the exterior of the adjacent fuel rods.

9. In a fuel bundle for a boiling water nuclear reactor having an upper tie-plate, a lower tie-plate, a channel extending between and surrounding said tie-plates and having an inside wall for forming a conduit between said tie plates, a plurality of fuel rods supported at the top by said upper tie-plate and at the bottom by said lower tie-plate and held in vertical upstanding side-by-side parallel relation within said channel between said tie-plates by fuel rod spacers, said fuel bundle for heating water coolant introduced in said channel through said lower tie-plate to the interior of said channel and producing a two phase steam/water mixture in said upper portion of said channel, one or more water chambers, said water chambers having water on the inside and having the exterior exposed to said channel, and at least one spacer located in an upper portion of said fuel bundle in said two phase region of said fuel bundle; the improvement in said channel and spacer comprising;

first flow trippers or group thereof configured in the inside channel wall in said upper two phase region of said fuel bundle, said flow trippers being placed below spacers and being defined by groove configured into the inside wall of said having a discontinuity at the upper edge thereof for diverting water flowing along the inside channel wall away from said wall;

second flow trippers or group thereof configured in the exterior of said water chambers in the upper two phase region of said fuel bundle, said flow trippers being placed below a spacer;

said spacer having a peripheral band, said band circumscribing said spacer and having a lower portion overlying said flow trippers;

said peripheral band having a skirt extending to and towards said inside channel wall overlying said flow trippers whereby water stripped from said channel wall by said flow trippers is deflected to and towards fuel rods within said fuel bundle; additional flow trippers configured in the exterior of said water chambers below said spacers;

and deflectors members in said spacer adjacent said water chambers, said deflector members overlying said flow trippers on the periphery of said water chambers whereby water stripped from said water chambers is deflected by said deflector member to and towards fuel rods within said fuel bundle.

10. The invention of claim 9 and including upper deflector tabs configured in said deflector member for deflecting water to and towards said fuel rods.

11. The invention of claim 10 wherein additional flow deflectors are located in the exterior spacer bands above the first flow deflectors.

12. The invention of claim 11 wherein additional flow trippers are located in the channel wall adjacent the spacer and directly below said additional flow deflectors.

13. The invention of claim 12 wherein additional flow deflectors are located in the interior spacer band surrounding the flow deflectors at the bottom of the interior spacer band.

14. The invention of claim 12 wherein additional flow trippers are located on the exterior walls of the water chambers directly below said additional flow deflectors.

* * * * *